US010005448B2

(12) United States Patent
Mansur et al.

(10) Patent No.: US 10,005,448 B2
(45) Date of Patent: Jun. 26, 2018

(54) LOAD BASED ENGINE START-STOP CONTROL

(71) Applicant: Ford Global Technologies, LLC, Dearborn, MI (US)

(72) Inventors: William Najib Mansur, West Bloomfield, MI (US); Ahmed Awadi, Farmington Hills, MI (US); Mark Douglas Malone, Canton, MI (US); Eric Michael Rademacher, Royal Oak, MI (US); Tuan Anh Be, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 72 days.

(21) Appl. No.: 15/077,369

(22) Filed: Mar. 22, 2016

(65) Prior Publication Data

US 2017/0274890 A1    Sep. 28, 2017

(51) Int. Cl.
| | |
|---|---|
| *B60L 11/18* | (2006.01) |
| *B60W 10/06* | (2006.01) |
| *B60W 10/26* | (2006.01) |
| *B60W 20/00* | (2016.01) |
| *B60W 20/13* | (2016.01) |

(52) U.S. Cl.
CPC .......... *B60W 20/13* (2016.01); *B60L 11/1842* (2013.01); *B60L 11/1862* (2013.01); *B60W 10/06* (2013.01); *B60W 10/26* (2013.01); *B60L 2240/44* (2013.01); *B60L 2240/441* (2013.01); *B60L 2250/12* (2013.01); *B60L 2260/26* (2013.01); *B60W 2510/244* (2013.01); *B60W 2710/06* (2013.01); *B60W 2710/242* (2013.01); *Y10S 903/905* (2013.01); *Y10S 903/907* (2013.01)

(58) Field of Classification Search
CPC ................. B60W 10/26; B60W 10/06; B60W 2710/242; B60W 2710/06; B60W 2510/244; B60L 11/1862; B60L 2240/44; B60L 1/006; Y10S 903/907; Y10S 903/905

See application file for complete search history.

(56) References Cited

U.S. PATENT DOCUMENTS

| | | | |
|---|---|---|---|
| 6,834,632 B2 | 12/2004 | Kataoka et al. | |
| 7,431,005 B2 | 10/2008 | Hawkins et al. | |
| 7,960,857 B2 * | 6/2011 | King .................. | B60L 11/1816 307/10.1 |
| 8,786,116 B2 | 7/2014 | Hatanaka et al. | |
| 8,886,380 B2 * | 11/2014 | Hisano ................ | B60W 20/106 180/65.265 |

(Continued)

FOREIGN PATENT DOCUMENTS

| | | |
|---|---|---|
| EP | 2650186 A2 | 10/2013 |
| JP | 2012-224187 | * 11/2012 |

*Primary Examiner* — Michael J Zanelli
(74) *Attorney, Agent, or Firm* — Brooks Kushman P.C.

(57) ABSTRACT

An engine control system for a vehicle includes a controller that initiates a start of the engine in response to a state of charge (SOC) of a battery falling below an engine start threshold, initiates a stop of the engine in response to the SOC exceeding an engine stop threshold, and adjusts a value of the engine start threshold based on whether a load remote from the vehicle is drawing power from the battery.

15 Claims, 5 Drawing Sheets

(56) References Cited

U.S. PATENT DOCUMENTS

| | | | | |
|---|---|---|---|---|
| 8,942,877 B2* | 1/2015 | Morisaki | ................ | B60K 6/445 180/65.28 |
| 2013/0231811 A1* | 9/2013 | Aoki | ....................... | B60L 11/18 701/22 |
| 2013/0297193 A1* | 11/2013 | Morisaki | ................ | B60K 6/445 701/112 |
| 2014/0278019 A1* | 9/2014 | Be | ........................... | F02D 29/02 701/112 |
| 2015/0191164 A1* | 7/2015 | Kinomura | ............. | B60W 10/08 701/22 |
| 2017/0101023 A1* | 4/2017 | Nawata | ............... | B60L 11/1842 |

* cited by examiner

LOAD BASED ENGINE START-STOP CONTROL

TECHNICAL FIELD

The present disclosure relates to methods and systems for controlling engine starting and stopping.

BACKGROUND

An engine of a vehicle may be automatically started or stopped to address ongoing energy needs of the vehicle. Control schemes have been used to start and stop the engine to meet such needs. One energy need provided by the engine in hybrid electric vehicles is maintenance of a battery's state of charge ("SOC"). Certain control schemes request the engine to auto-start below a first SOC threshold and auto-stop above a second SOC threshold.

SUMMARY

A vehicle includes a battery and a controller. The controller is configured to, in response to detecting a load remote from the vehicle drawing power from the battery, decrease to a first predefined value a state of charge (SOC) threshold at which engine start is initiated. The controller is also configured to in response to detecting that the load is no longer drawing power from the battery, increase the SOC threshold, and in response to a SOC falling below the threshold, initiate engine start.

A control method for a vehicle includes, by a controller, decreasing a state of charge (SOC) threshold at which engine start is initiated in response to detecting a load remote from the vehicle drawing power from a vehicle battery and user input authorizing the decreasing, increasing the SOC threshold in response to detecting subsequent absence of the load, and initiating engine start in response to a SOC falling below the SOC threshold.

An engine control system for a vehicle includes a controller configured to initiate a start of the engine in response to a state of charge (SOC) of a battery of the vehicle falling below an engine start threshold, to initiate a stop of the engine in response to the SOC exceeding an engine stop threshold, and to adjust a value of the engine start threshold based on whether a load remote from the vehicle is drawing power from the battery.

DETAILED DESCRIPTION

Figure 1:
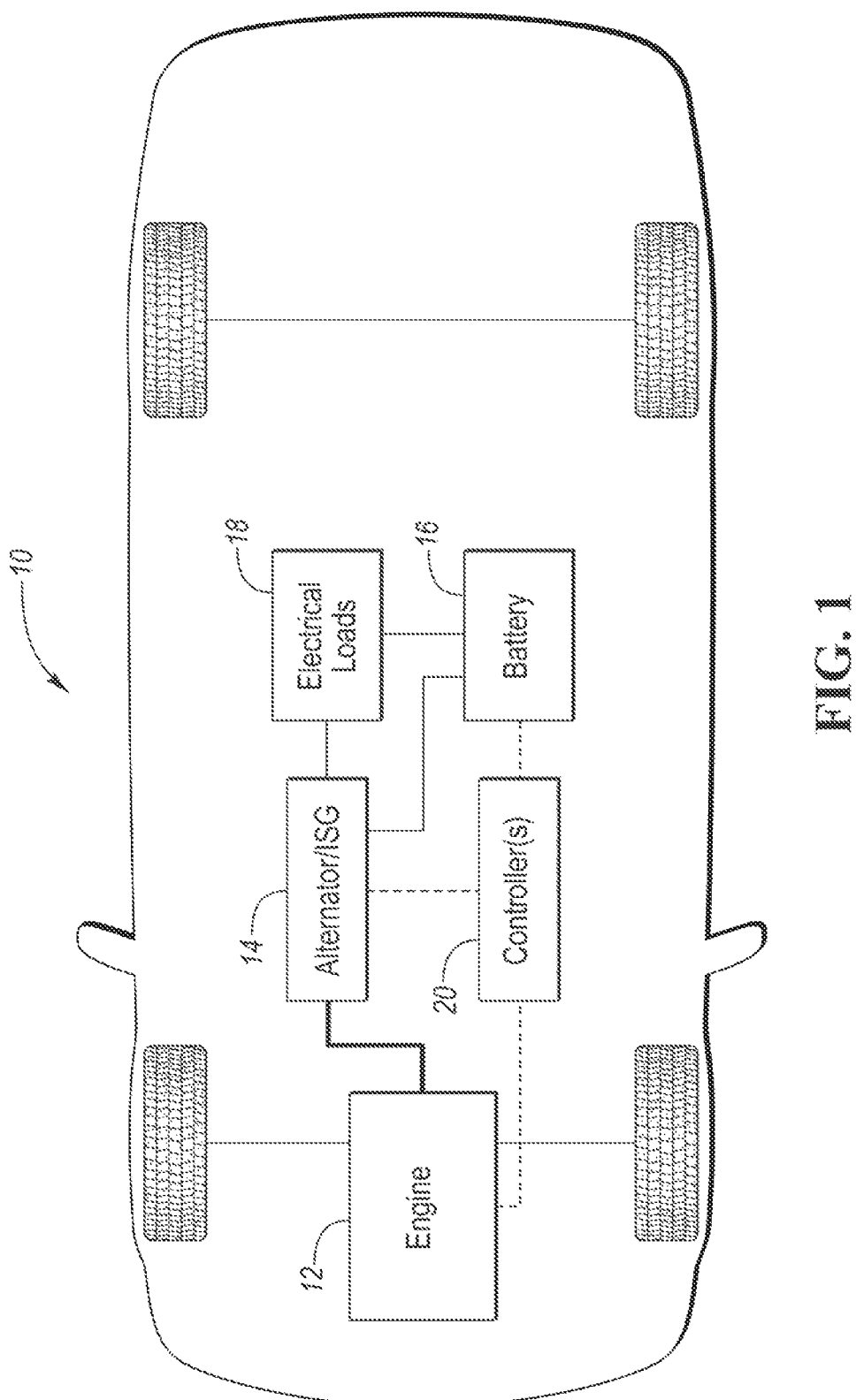
FIG. 1 is a block diagram of a hybrid vehicle.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicles can be powered by battery electricity (BEVs) for propulsion and other electrical loads, such as heating and cooling. The battery may be recharged by a secondary power source (e.g. charging station, internal combustion engine, or solar panel). The battery may be arranged in an array with other batteries to provide additional voltage or longevity, and any type of battery may be used. Any type of battery including different combinations of electrolyte, anode material, cathode material, or combination thereof may power BEVs. In addition, capacitors may also be used to substitute or supplement battery arrays. Some common batteries in BEVs may include nickel metal hydride, lead-acid, and lithium-ion.

Vehicles may also be powered via a combination of battery electricity and internal combustion engine. Referred to as hybrid electric vehicles, these vehicles typically employ a combination of battery and engine propulsion and rely on these sources to power auxiliary electrical loads. Electrical loads may be heated windshields, cabin heaters, cabin coolers, auxiliary fans, sound systems, powered window actuation, wireless communications, indicators, or other electrical draws necessary for vehicle use and habitability. To replace removed electrical energy, the engine may be used to recharge the battery through a mechanically coupled electric generator. There are many known configurations used in hybrid vehicles to mechanically couple the engine to a generator (e.g. a power-split configuration using a planetary gear set). All of these configurations and future configurations are contemplated in this disclosure. The vehicle may also employ multiple engines or electric generators. Any combination or types of engines, electric generators, and alternators are also contemplated in this disclosure. One example includes a gasoline internal combustion engine and an integrated starter generator (ISG). An integrated starter generator can provide engine starting cranks while generating electricity after the engine has started.

A controller may be configured with a battery's optimal state of charge (SOC), which is generally below the maximum battery charge and above a minimum battery charge. Batteries within an array may have varying maximum charge levels. The battery's (array) target may be set to 70% of a hypothetical maximum charge because the maximum charge of each individual battery may be uncertain. This 70% target may be set higher or lower depending on manufacturer specifications or requirements. It is contemplated in this disclosure that the target may be set at the actual maximum charge of the battery or could be set at a lower value. The controller may allow an auto-stop or perform an auto-stop when the battery's SOC meets or exceeds the target. An auto-stop of the engine would then stop the generation of electricity, which may prevent the battery from overcharging. The controller may allow an auto-start or perform an auto-start when the battery's SOC meets or exceeds the minimum threshold. An auto-start of the engine would then generate electricity, which could allow the vehicle to resume normal operations or extend the electric vehicle operation. Thresholds may be set at a value that is reached before the battery minimum or maximum. These thresholds balance battery life, fuel consumption, and battery SOC.

Modern vehicles may include an additional electrical bus to power accessories. This accessory bus may be a 12 volt DC (direct current) outlet or 110/120 volt AC (alternating current) outlet. The AC or DC accessory bus voltage may be adjusted to meet industry standards. For example, the AC bus may have a voltage of 220/240 in various countries or regions. The accessory bus may also have a higher voltage that is stepped down at each outlet or group of outlets. For example, the accessory bus may be a 48 volt bus with stepped down outlets having 12 volt output.

The accessory bus may provide the passengers with the ability to power accessories not contemplated by the vehicle design. For example, passengers may want to power refrigerators or televisions at a tailgate. Passengers may also want to power and recharge new-age electrical devices (e.g., tablet computers or smart phones). Some of these devices may draw significant power from the vehicle battery. This power draw, among others, may require the internal combustion engine (ICE) to start in order to maintain the vehicle battery SOC within a desired range. Cycling of the ICE may require a high current draw to turn the engine over. In order to ensure adequate current is available, a cycling of the ICE may remove energy supplied to the additional electrical bus for a short period. This loss of power may have detrimental effects on the accessories plugged into the port. For instance, a computer drawing power from the bus may suffer memory loss. Intermittent power loss may also increase wear and tear on compressors or electric machines. A control scheme implemented to address these issues may alleviate or diminish the detrimental effects of power loss.

A sensor or sensing method may be implemented to determine whether an accessory is plugged into the accessory bus. The accessory may be plugged to an external port. The sensing method may be a mechanical device (e.g., switch or push and turn outlet). The sensing method may be an electronic sensor (e.g., Hall sensor or current clamp). The control scheme may recognize an accessory drawing power from the bus and inhibit or postpone an engine stop or start. The engine start may be postponed to delay a loss of power to the accessory bus. If the engine is already running, the engine stop may be postponed to charge the vehicle battery to a higher threshold.

The sensing method used to determine a load on the bus may be improved by taking into account the magnitude of the load on the accessory bus. An accessory threshold may be set to prevent unnecessary deviation from the standard start/stop thresholds. Accessories with minimal loads may not suffer detrimental effects from intermittent power. For example, intermittent power interruptions to cellular phones may not have a higher importance than the SOC of the battery. The control scheme may freely start and stop the engine with a cellular phone load. The control scheme may recognize that loads drawing more than ten amps DC or an equivalent quadratic mean or root mean square of the AC current. The control scheme may recognize an accessory drawing power from the bus above the accessory threshold and inhibit or postpone an engine stop or start. The engine start may be postponed to delay a loss of power to the accessory bus. If the engine is already running, the engine stop may be postponed to charge the vehicle battery to a higher threshold. Although an engine stop may not always cause power interruptions to the accessory bus, it may cause latent interruptions. These latent interruptions are manifested when the ICE is required to start due to a low SOC. The low SOC may be reached when the SOC of the battery is not charged to a maximum level or a level higher than normal. The control scheme may anticipate these latent interruptions by charging the batteries to a higher SOC than normal to extend a period of battery operation.

The accessory threshold may be adjusted based on the type of current drawn. For instance, the accessory threshold for DC could be 36 watts, while the accessory threshold for AC could be 40 watts RMS ("root-mean-square"). The accessory threshold may also vary based on the type of load. For example, a lagging load, such as a compressor or motor, may receive a lower accessory threshold. A leading load, such as a capacitive load, may receive a higher accessory threshold, or vice versa. The accessory threshold may also take into account the power factor of an alternating current. For example, a load having a power factor of one may have an accessory threshold of 40 watts RMS, while a load having a power factor of 0.5 may have an accessory threshold of 20 watts RMS.

Passengers may appreciate higher gas mileage or enhanced performance. Higher gas mileage may be achieved by altering the SOC thresholds when the ICE is used to recharge the battery. Conversely, enhanced performance may be achieved when the ICE is used or used in tandem with the electric traction motor. The control system of the vehicle may come equipped to operate in different modes to suit passenger preferences. The control system may include an economy mode or Eco-mode to reduce consumption of fossil fuels. In order to reduce fossil fuel consumption the system may ignore the upper SOC threshold associated with an engine stop that is adjusted to increase the maximum SOC. Ignoring an adjusted SOC threshold may stop the ICE earlier, and thus, reduce the expenditure of fossil fuels.

Another optional embodiment may include user or passenger input. A request for input may be presented to the user on a human-machine interface (HMI) or connected mobile device. The user may specify a preference to either run the vehicle in a mode to prevent a loss of power to the accessory bus or a normal mode. The control scheme may use the user selection along with the accessory threshold specified above. Meaning, the user may only give a preference when the accessory threshold current draw has been exceeded. This may limit interruptions to the driving experience of the user.

Referring to FIG. 1, a hybrid vehicle 10 may include an engine 12, ISG 14, battery 16, electrical loads 18, and controller 20. The engine may have a direct mechanical linkage to the ISG 14. The ISG may be electrically connected to the battery 16 and electrical loads 18. The battery 16 may be connected to the electrical loads 18. The controller 20 may be in communication with the engine 12, ISG 14, and battery 16.

Figure 2:
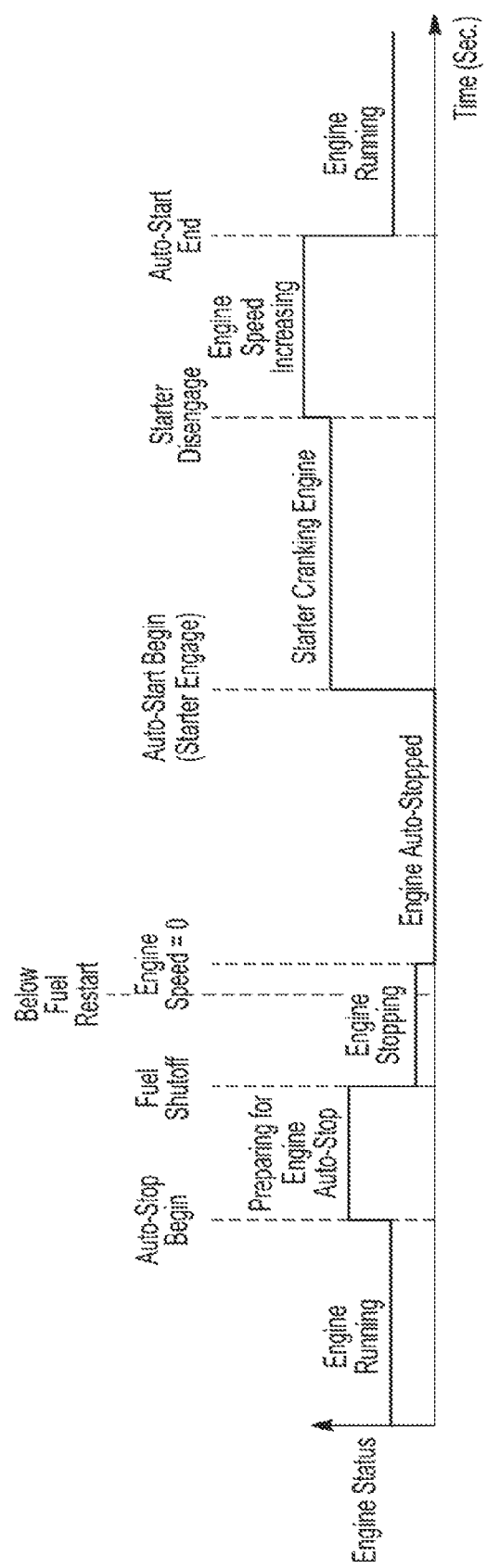
FIG. 2 is a plot of engine status versus time before, during, and after an engine start/stop event.

Referring to FIG. 2, an engine auto-stop event may include several stages. "Auto-stop begin" marks the beginning of the engine auto-stop event. "Preparing for engine auto-stop" is the time period during which vehicle systems as well as the engine are prepared for the impending engine stop. "Fuel shutoff" marks the point at which fuel flow to the engine is stopped. "Engine stopping" is the time period during which the engine speed reduces to 0. "Below fuel restart" marks the point where if a restart is requested during the "engine stopping" stage, the starter may need to be engaged to crank the engine (if a restart is requested before "below fuel restart" and during the "engine stopping" stage, the engine may be restarted by turning the flow of fuel back on). "Engine speed=0" marks the point at which the engine speed is near or equal to 0. "Engine auto-stopped" is the time period during which the engine is off. "Starter engage" marks the point at which the starter starts to crank the engine in an effort to start the engine (in response to detecting an engine auto-start condition). "Starter cranking engine" is the time period during which the engine is unable to crank under its own power. "Starter disengage" marks the point at which the engine is able to crank under its own power. "Engine speed increasing" is the time period during which the speed of the engine increases to its running speed (a speed at or above target idle speed). Finally, "auto-start end" marks the point at which the speed of the engine achieves its running speed.

In at least one instance, the controller may allow an auto-start when the SOC falls below a minimum threshold if the engine has not reached a "below fuel restart." This may be because unless the engine falls "below fuel restart" additional cranks from the starter are not required and the engine can simply restart with reinjection of fuel.

Figure 3:
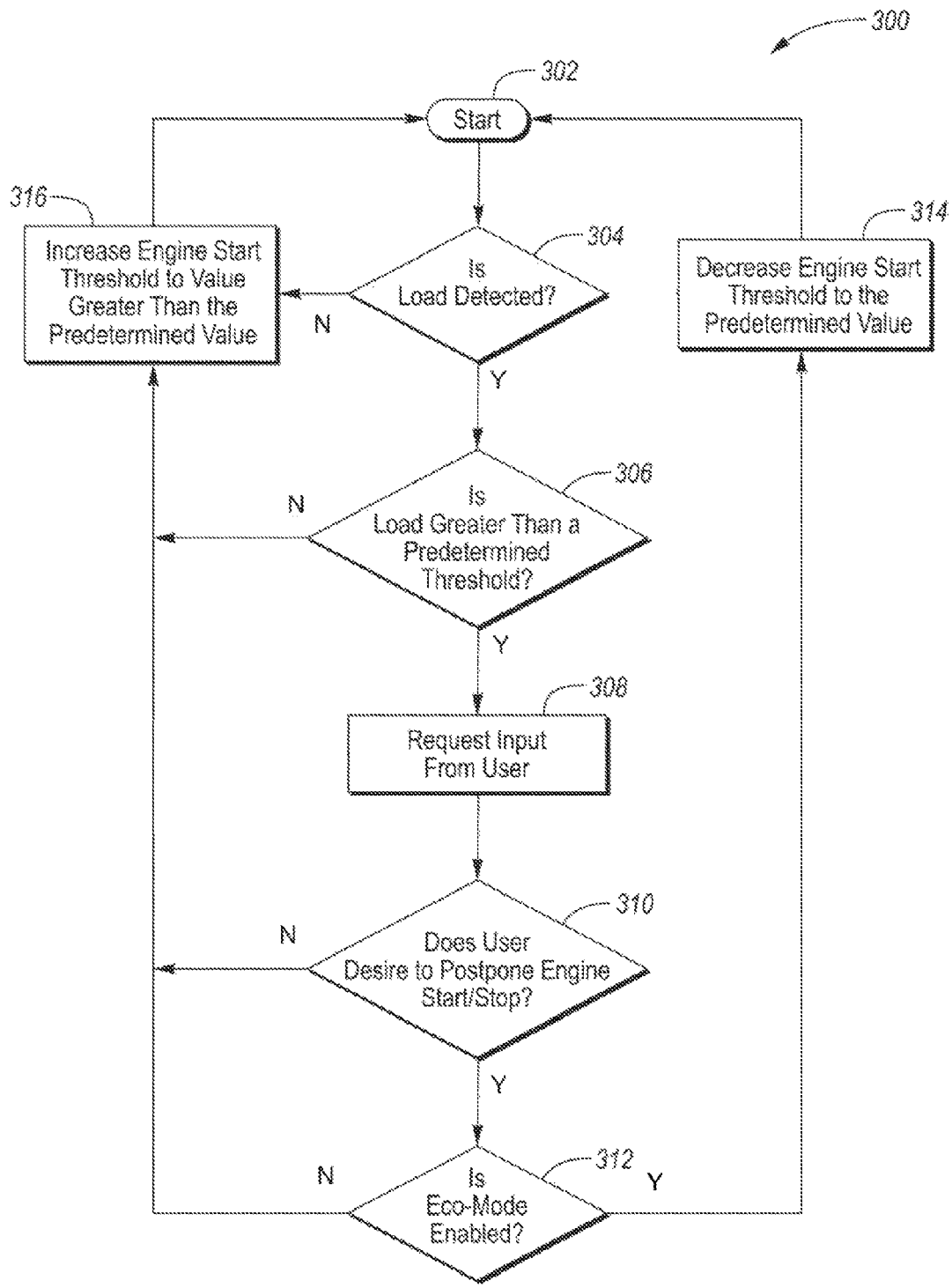
FIG. 3 is a flow chart of a control algorithm for determining whether to auto-start an engine.

Now referring to FIG. 3, a flowchart 300 for setting the engine start threshold is depicted. At step 302, the process begins. The process may continuously run. At step 304, a load may be detected by the controller. Multiple methods may be used by the controller to determine whether an accessory load is present. For example, the controller may sense actuation of a mechanical switch associated with or protecting the outlet. The controller may electrically sense current flow and level using a sensing device. The controller may also receive user input to indicate that a load is present. In step 306, the controller may determine whether the load is greater than a predetermined threshold. For example, the controller may have particular set points associated with either the AC or DC outlets of an accessory bus to determine which SOC threshold to use. In step 308, the controller may request input from a user. The input may be used to determine whether to set an SOC such that an engine stop or start is postponed in step 310. In step 312, the controller may determine whether an Eco-mode is enabled to ignore a request to delay stop/start. The Eco-mode may be enabled to conserve fossil fuels in a vehicle. Step 312, prevents additional use of the ICE to reduce intermittent power losses on the accessory bus.

The flowchart 300 includes multiple decision points that may or may not be included in the control scheme. For example, the control scheme may remove the user input decision point and request in steps 308, 310 to streamline the process. With steps 308 and 310 removed, the control scheme would determine whether the load was greater than a predetermined threshold in step 306 and then determine whether Eco-mode was enabled in step 312. Any of the steps may be performed in any order. For instance, an Eco-mode determination in step 312 may be performed prior to a user request in step 308.

Figure 4:
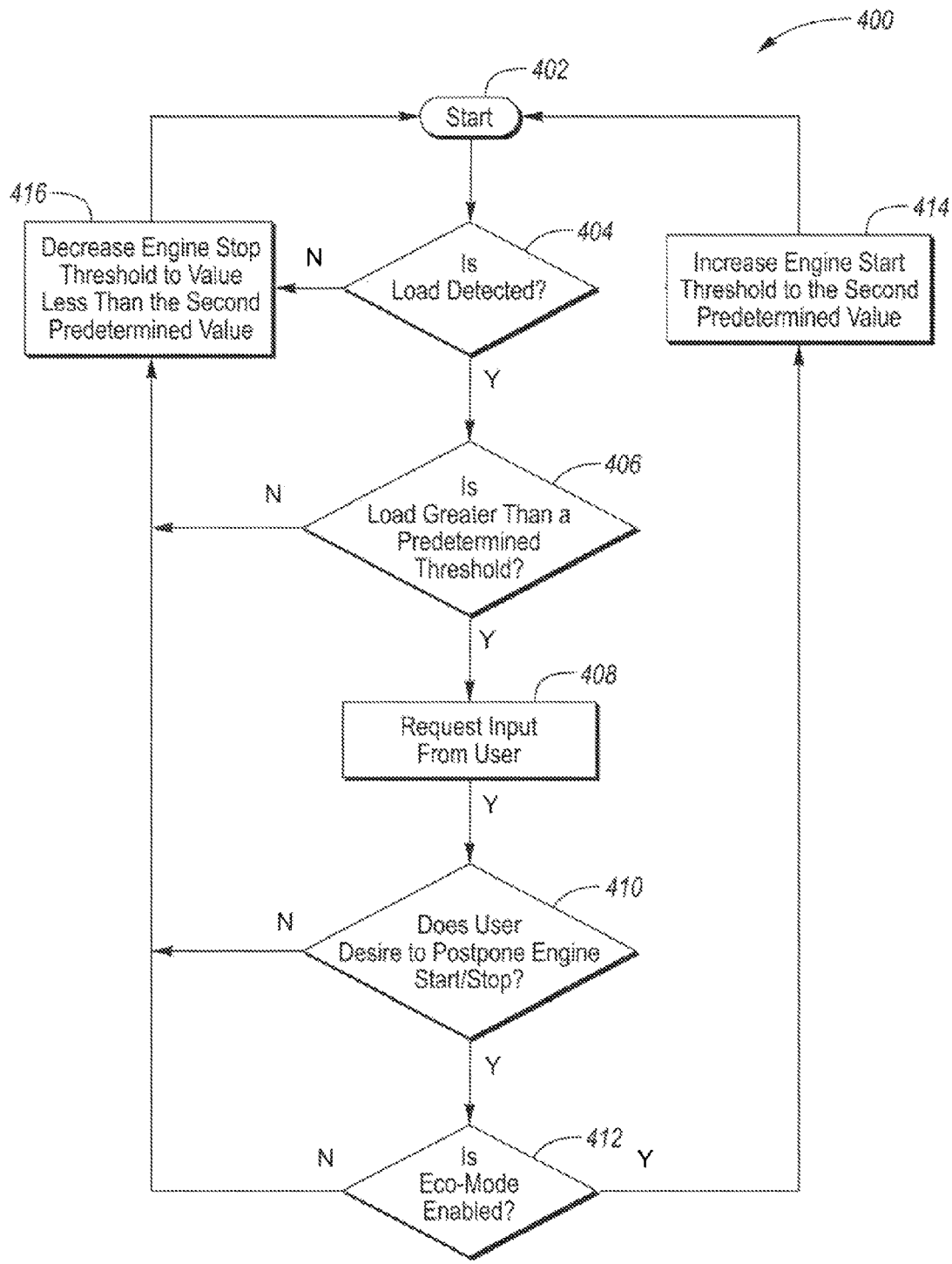
FIG. 4 is a flow chart of a control algorithm for determining whether to auto-stop an engine.

Now referring to FIG. 4, a flowchart 400 for setting the engine start threshold is depicted. At step 402, the process begins. The process may continuously run. At step 404, a load may be detected by the controller. Multiple methods may be used by the controller to determine whether an accessory load is present. For example, the controller may sense actuation of a mechanical switch associated with or protecting the outlet. The controller may electrically sense current flow and level using a sensing device. The controller may also receive user input to indicate that a load is present. In step 406, the controller may determine whether the load is greater than a predetermined threshold. For example, the controller may have particular set points associated with either the AC or DC outlets of an accessory bus to determine which SOC threshold to use. In step 408, the controller may request input from a user. The input may be used to determine whether to set an SOC such that an engine stop or start is postponed in step 410. In step 412, the controller may determine whether an Eco-mode is enabled to ignore a request to delay stop/start. The Eco-mode may be enabled to conserve fossil fuels in a vehicle. Step 412, prevents additional use of the ICE to reduce intermittent power losses on the accessory bus.

The flowchart 400 includes multiple decision points that may or may not be included in the control scheme. For example, the control scheme may remove the user input decision point and request in steps 408, 410 to streamline the process. With steps 408 and 410 removed, the control scheme would determine whether the load was greater than a predetermined threshold in step 406 and then determine whether Eco-mode was enabled in step 412. Any of the steps may be performed in any order. For instance, an Eco-mode determination in step 412 may be performed prior to a user request in step 408.

Figure 5A:
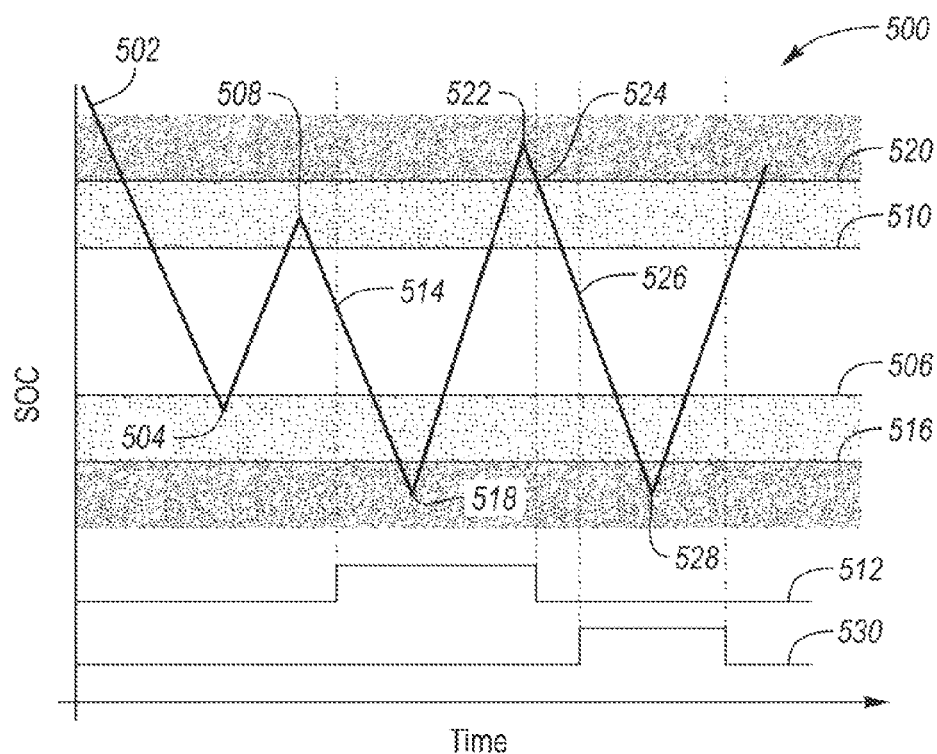
FIG. 5A is a plot of a battery's state of charge versus time before, during, and after an engine start/stop event.

Referring now to FIG. 5A, a plot 500 whereby a vehicle controller performs an embodiment of this disclosure. Starting from the left of the chart and working right, the controller determines the battery's SOC at point 502. As the SOC begins to fall due to an activation of electrical loads during normal operation, the controller initiates an engine start 504 at a value 506 greater than a first predefined value 516. The engine start may take place near an SOC value of 40%. The engine start may recharge the battery, increasing the SOC 502. The SOC 502 may exceed a value 510 less than a second predefined value 520, resulting in an engine stop at point 508. As the SOC 502 decreases, the controller may detect a load 512 at point 514. As the SOC 502 continues to drop, the SOC passes through the value 506 greater than a first predefined value 516, and the controller initiates an engine start 518 at the first predefined value 516. The engine start may recharge the battery, increasing the SOC 502. It should be mentioned that a user could prevent the postponement of the engine start. For example, a user may elect that the engine start at the value 506 greater than the first predefined value 516. The control system may also initiate the engine start at the value 506 greater than the first predefined value 516 if the accessory load is not above a predefined threshold. Plot 500 is only one example of many control schemes. The SOC 502 may exceed a value 510 less than a second predefined value 520. The SOC 502 may increase until the second predefined value 520 is exceeded, resulting in an engine stop at point 522. After the engine stop at point 522, the SOC 502 begins to decrease. At point 524, the controller may determine that the load 512 has been removed from the accessory bus. The vehicle may enter an Eco-mode 530 at point 526, which postpones an engine start 528 until the first predefined value 516 is exceeded to reduce fuel consumption even when an accessory load is not present.

Figure 5B:
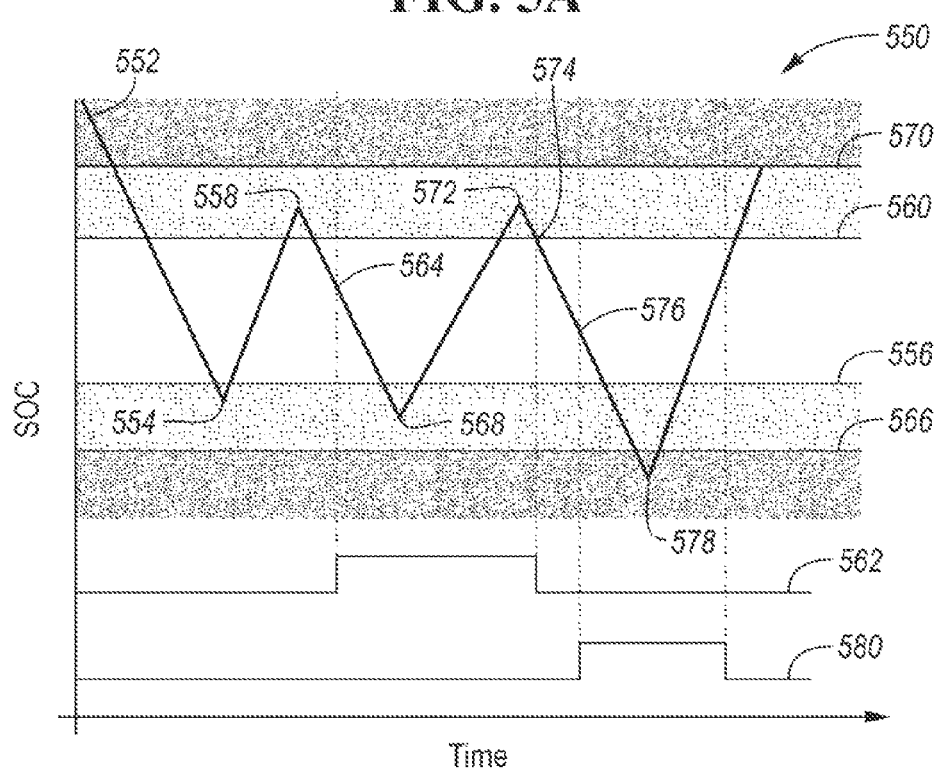
FIG. 5B is a plot of a battery's state of charge versus time before, during, and after an engine start/stop event.

Referring now to FIG. 5B, a plot 550, similar to plot 500, whereby a vehicle controller performs an embodiment of this disclosure. Starting from the left of the chart and working right, the controller determines the battery's SOC at point 552. As the SOC begins to fall due to an activation of electrical loads during normal operation, the controller initiates an engine start 554 at a value 556 greater than a first predefined value 566. The engine start may take place near an SOC value of 40%. The engine start may recharge the battery, increasing the SOC 552. The SOC 552 may exceed a value 560 less than a second predefined value 570, resulting in an engine stop at point 558. As the SOC 552 decreases, the controller may detect a load 562 at point 564. As shown, the behavior of the controller is different than that of FIG. 5A. As the SOC 552 continues to drop, the SOC passes through the value 556, and the controller initiates an engine start 558. This controller behavior may be due to user input. The controller may also behave similarly if the accessory load is not above the accessory load threshold. At point 558, the engine start may recharge the battery, increasing the SOC 552. In a similar fashion to the engine start, the controller may stop the engine with a load present due to user input or the magnitude of the accessory load. As shown, the SOC 552 may exceed a value 560 less than a second predefined value 570. The SOC 552 may increase until the value 560 is exceeded, resulting in an engine stop at point 572. After the engine stop at point 572, the SOC 552 begins to decrease. At point 574, the controller may determine that the load 562 has been removed from the accessory bus. The vehicle may enter an Eco-mode 580 at point 576, which postpones an engine start 578 until the first predefined value 566 is exceeded to reduce fuel consumption even when an accessory load is not present.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   a battery; and
   a controller configured to
   in response to detecting a load remote from the vehicle drawing power from the battery, decrease to a first predefined value a state of charge (SOC) threshold at which engine start is initiated,
   in response to detecting that the load is no longer drawing power from the battery, increase the SOC threshold, and
   in response to a SOC falling below the threshold, initiate engine start.

2. The vehicle of claim 1, wherein the controller is further configured to
   in response to detecting the load remote from the vehicle drawing power from the battery, increase to a second predefined value a SOC threshold at which engine stop is initiated, and
   in response to the SOC exceeding the SOC threshold at which engine stop is initiated, initiate engine stop.

3. The vehicle of claim 2, wherein the controller is further configured to, in response to detecting that the load is no longer drawing power from the battery, decrease the SOC threshold at which engine stop is initiated.

4. The vehicle of claim 2, wherein the controller is further configured to, in response to detecting presence of a request for economy mode, preclude the increase to a second predefined value.

5. The vehicle of claim 1, wherein the controller is further configured to, in response to detecting presence of a request for economy mode, preclude the decrease.

6. A method comprising:
   by a controller,
   decreasing a state of charge (SOC) threshold at which engine start is initiated in response to detecting a load remote from a vehicle drawing power from a vehicle battery and user input authorizing the decreasing unless a request for economy mode exists,
   increasing the SOC threshold in response to detecting subsequent absence of the load, and
   initiating engine start in response to a SOC falling below the SOC threshold.

7. The method of claim 6 further comprising increasing to a predefined value a SOC threshold at which engine stop is initiated in response to detecting the load remote from the vehicle drawing power from the battery, and initiating engine stop in response to the SOC exceeding the SOC threshold at which engine stop is initiated.

8. The method of claim 7 further comprising decreasing the SOC threshold at which engine stop is initiated in response to detecting subsequent absence of the load.

9. The method of claim 7 further comprising precluding the increasing to a predefined value in response to detecting presence of a request for economy mode.

10. An engine control system for a vehicle comprising:
    a controller configured to initiate a start of the engine in response to a state of charge (SOC) of a battery of the vehicle falling below an engine start threshold, to initiate a stop of the engine in response to the SOC exceeding an engine stop threshold, and to adjust a value of the engine start threshold based on whether a load remote from the vehicle is drawing power from the battery.

11. The system of claim 10, wherein the adjusting includes decreasing in response to the load drawing power from the battery.

12. The system of claim 11, wherein the adjusting includes increasing in response to the load no longer drawing power from the battery.

13. The system of claim 10, wherein the controller is further configured to adjust a value of the engine stop threshold based on whether the load remote from the vehicle is drawing power from the battery.

14. The system of claim 13, wherein the adjusting a value of the engine stop threshold includes increasing in response to the load drawing power from the battery.

15. The system of claim 14, wherein the adjusting a value of the engine stop threshold includes decreasing in response to the load no longer drawing power from the battery.

* * * * *